US010611639B2

(12) United States Patent
Sano et al.

(10) Patent No.: US 10,611,639 B2
(45) Date of Patent: Apr. 7, 2020

(54) ACTIVE MATERIAL, METHOD FOR MANUFACTURING ACTIVE MATERIAL, ELECTRODE, LITHIUM ION SECONDARY BATTERY, AND METHOD FOR MANUFACTURING LITHIUM ION SECONDARY BATTERY

(75) Inventors: Atsushi Sano, Tokyo (JP); Keitaro Otsuki, Tokyo (JP); Tomohiko Kato, Tokyo (JP); Akinobu Nojima, Tokyo (JP); Akiji Higuchi, Kyoto (JP)

(73) Assignee: TDK CORPORATION, Tokyo (JP)

(*) Notice: Subject to any disclaimer, the term of this patent is extended or adjusted under 35 U.S.C. 154(b) by 731 days.

(21) Appl. No.: 14/005,357

(22) PCT Filed: Mar. 30, 2012

(86) PCT No.: PCT/JP2012/058508
§ 371 (c)(1),
(2), (4) Date: Sep. 16, 2013

(87) PCT Pub. No.: WO2012/133731
PCT Pub. Date: Oct. 4, 2012

(65) Prior Publication Data
US 2014/0004416 A1  Jan. 2, 2014

(30) Foreign Application Priority Data

Mar. 31, 2011 (JP) ................. 2011-080137

(51) Int. Cl.
*C01B 25/45* (2006.01)
*H01M 4/485* (2010.01)
*H01M 4/1397* (2010.01)
*H01M 4/1391* (2010.01)
*H01M 4/58* (2010.01)
*H01M 10/0525* (2010.01)
*H01M 10/052* (2010.01)
*H01M 10/0585* (2010.01)

(52) U.S. Cl.
CPC ......... *C01B 25/45* (2013.01); *H01M 4/1391* (2013.01); *H01M 4/1397* (2013.01); *H01M 4/485* (2013.01); *H01M 4/5825* (2013.01); *H01M 10/052* (2013.01); *H01M 10/0525* (2013.01); *H01M 10/0585* (2013.01)

(58) Field of Classification Search
CPC .. H01M 4/1391; H01M 4/1397; H01M 4/485; H01M 4/5825; H01M 10/052; H01M 10/0525; H01M 10/0585; C01B 25/45
See application file for complete search history.

(56) References Cited

U.S. PATENT DOCUMENTS

| 7,838,152 | B2* | 11/2010 | Cheon et al. ............ 429/232 |
| 2010/0233544 | A1 | 9/2010 | Sano et al. |
| 2010/0233545 | A1 | 9/2010 | Sano et al. |
| 2011/0052995 | A1* | 3/2011 | Sano .................. C01B 25/45 |
| | | | 429/231.5 |
| 2012/0129033 | A1 | 5/2012 | Tanino |

FOREIGN PATENT DOCUMENTS

| JP | A 2003-68304 | 3/2003 |
| JP | A 2004-303527 | 10/2004 |
| JP | A 2007-317583 | 12/2007 |
| JP | A 2010-218822 | 9/2010 |
| JP | A-2010-218824 | 9/2010 |
| JP | A 2010-218830 | 9/2010 |
| JP | A 2011-54559 | 3/2011 |

OTHER PUBLICATIONS

Lii et al; "Hydrothermal Synthesis, Structure, and Magnetic Properties of a New Polymorph of Lithium Vanadyl(IV) Orthophosphate: β-LiVOPO$_4$;" Journal of Solid State Chemistry; 1991; vol. 95; pp. 352-359.
Dupré et al; "Positive electrode materials for lithium batteries based on VOPO$_4$;" Solid State Ionics; 2001; vol. 140; pp. 209-221.
Dupré et al; "Electrochemical performance of different Li-VOPO$_4$ systems;" Journal of Power Sources; 2001; vol. 97-98; pp. 532-534.
Barker et al; "Electrochemical Properties of Beta-LiVOPO$_4$ Prepared by Carbothermal Reduction;" Journal of the Electrochemical Society; 2004; vol. 151; No. 6; pp. A796-A800.
Azmi et al; "Cathodic Performance of LiVOPO$_4$ Prepared by Impregnation Method for Li Ion Secondary Battery;" Electrochemistry; 2003; vol. 71; No. 12; pp. 1108-1110.
May 1, 2012 Search Report issued in International Patent Application No. PCT/JP2012/058508 (with translation).

* cited by examiner

*Primary Examiner* — Gregg Cantelmo
(74) *Attorney, Agent, or Firm* — Oliff PLC

(57) ABSTRACT

A method for manufacturing an active material, capable of improving the discharge capacity of a lithium ion secondary battery is provided. The method for manufacturing an active material according to the present invention includes a first step of heating a mixture solution including a lithium source, a phosphate source, a vanadium source, and water under pressure to generate a precursor in the mixture solution, and adjusting the pH of the mixture solution including the precursor to be 6 to 8; and a second step of heating the precursor at 425 to 650° C. after the first step to generate an active material.

7 Claims, 11 Drawing Sheets

(a)

(b)

(c)

ACTIVE MATERIAL, METHOD FOR MANUFACTURING ACTIVE MATERIAL, ELECTRODE, LITHIUM ION SECONDARY BATTERY, AND METHOD FOR MANUFACTURING LITHIUM ION SECONDARY BATTERY

TECHNICAL FIELD

The present invention relates to an active material, a method for manufacturing an active material, an electrode, a lithium ion secondary battery, and a method for manufacturing a lithium ion secondary battery.

BACKGROUND ART

A layered compound such as $LiCoO_2$ or $LiNi_{1/3}Mn_{1/3}Co_{1/3}O_2$ or a spinel compound such as $LiMn_2O_4$ has conventionally been used as a positive electrode material (positive electrode active material) for a lithium ion secondary battery. In recent years, a compound with an olivine type structure typified by $LiFePO_4$ has attracted attention. It is known that the positive electrode material having the olivine structure is highly safe because of having high thermal stability at high temperature. A lithium ion secondary battery with $LiFePO_4$, however, has a drawback of having a discharging/discharging voltage as low as 3.5 V and low energy density. In view of this, $LiCoPO_4$, $LiNiPO_4$, and the like have been suggested as phosphate-based positive electrode material that can achieve high charging/discharging voltage. However, at present, a lithium ion secondary battery with such a positive electrode material has not yet achieved sufficient capacity. Among the phosphate-based positive electrode materials, $LiVOPO_4$ has been known as a compound that can achieve a charging/discharging voltage as high as 4 V. In such a lithium ion secondary battery with $LiVOPO_4$, however, sufficient reversible capacity and rate characteristic have not yet been obtained. The positive electrode material as above is disclosed in Patent Documents 1 and 2 and Non-Patent Documents 1 to 5 below. The lithium ion secondary battery may be referred to as "battery" in this specification.

CITATION LIST

Patent Documents

Patent Document 1: JP-A-2003-68304
Patent Document 2: JP-A-2004-303527

Non-Patent Documents

Non-Patent Document 1: J. Solid State Chem., 95, 352 (1991)
Non-Patent Document 2: N. Dupre et al., Solid State Ionics, 140, pp. 209-221 (2001)
Non-Patent Document 3: N. Dupre et al., J. Power Sources, 97-98, pp. 532-534 (2001)
Non-Patent Document 4: J. Baker et al. J. Electrochem. Soc., 151, A796 (2004)
Non-Patent Document 5: Electrochemistry, 71, 1108 (2003)

DISCLOSURE OF THE INVENTION

Problems to be Solved by the Invention

The present invention has been made in view of the above problem of the conventional art, and an object of the present invention is to provide an active material that can improve the discharge capacity of a lithium ion secondary battery, a method for manufacturing the active material, an electrode, a lithium ion secondary battery, and a method for manufacturing the lithium ion secondary battery.

Solutions to the Problems

In order to achieve the above object, an active material according to the present invention includes β-type crystal of $LiVOPO_4$, and the distortion in the <100> direction of the β-type crystal is 1.2% or less.

An electrode according to the present invention includes a current collector and an active material layer stacked on the current collector. The active material layer contains the active material according to the present invention.

A lithium ion secondary battery according to the present invention includes the electrode according to the present invention.

As compared with a conventional battery including conventional $LiVOPO_4$ with large distortion in an active material layer, the lithium ion secondary battery according to the present invention can have higher discharge capacity.

In the present invention, the active material layer preferably includes carbon with a tap density of 0.03 to 0.09 g/ml and carbon with a tap density of 0.1 to 0.3 g/ml. Thus, the discharge capacity of the battery is easily improved.

A method for manufacturing an active material according to the present invention includes a first step of heating a mixture solution including a lithium source, a phosphate source, a vanadium source, and water at 150 to 190° C. under pressure to generate a precursor in the mixture solution and adjusting the pH of the mixture solution including the precursor to be in the range of 6 to 8, and a second step, after the first step, of generating an active material by heating the precursor at 425 to 650° C.

According to the method for manufacturing an active material of the present invention, an active material with β-type crystal of $LiVOPO_4$ having a distortion of 1.2% or less in <100> direction can be manufactured.

A method for manufacturing a lithium ion secondary battery of the present invention includes a step of applying a coating including the active material obtained by the above manufacturing method of the present invention, a binder, a solvent, and a conductive auxiliary agent on a current collector, and forming an electrode including the current collector and an active material layer stacked on the current collector. Thus, a lithium ion secondary battery according to the present invention having excellent discharge capacity can be provided.

Effects of the Invention

According to the present invention, an active material that can improve the discharge capacity of a lithium ion secondary battery, a method for manufacturing the active material, an electrode, a lithium ion secondary battery, and a method for manufacturing the lithium ion secondary battery can be provided.

1(c) is a schematic diagram of a crystal structure (crystal lattice) of the LiVOPO$_4$ crystal with distortion.

Figure 2:
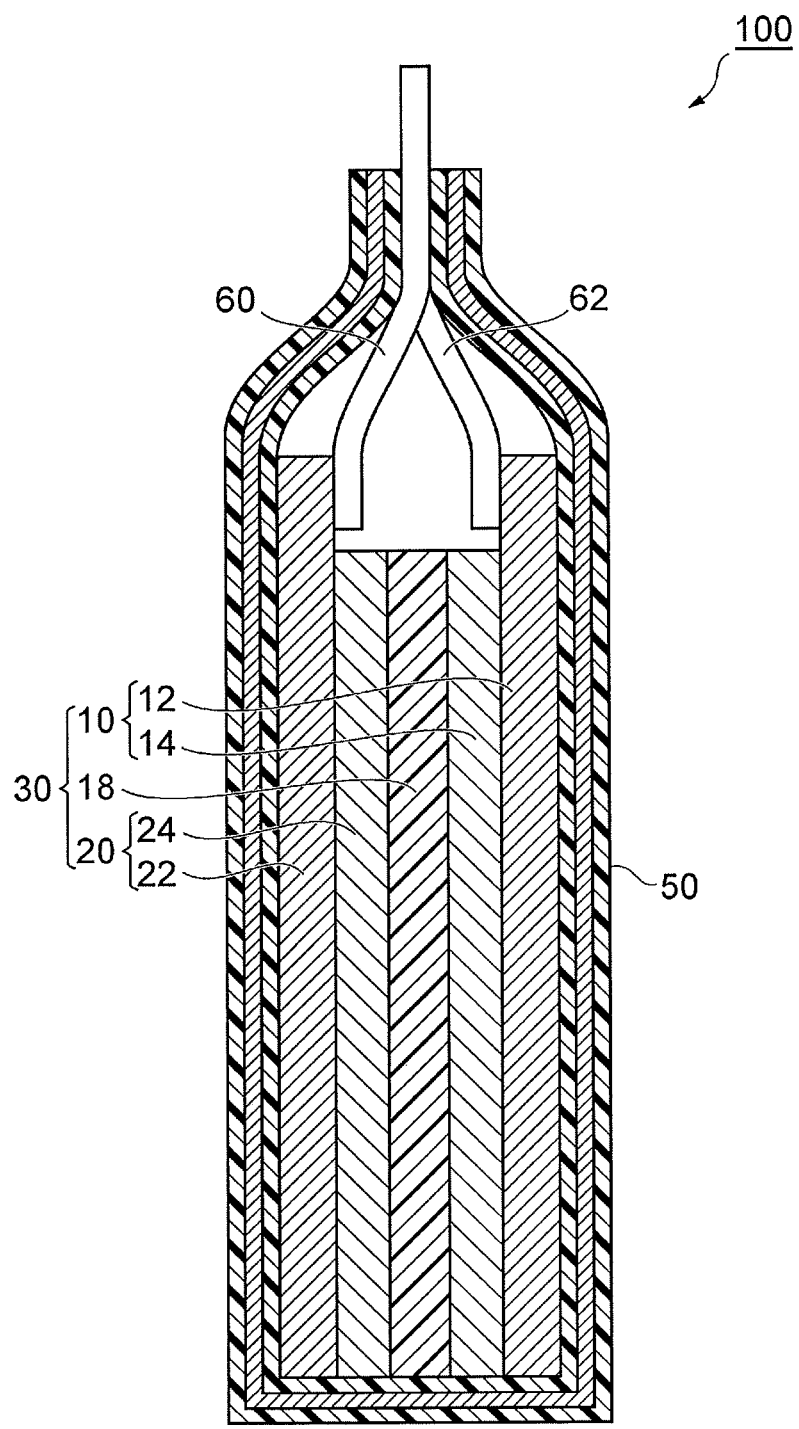

FIG. 2 is a schematic sectional view of a lithium ion secondary battery according to an embodiment of the present invention.

Figure 3:
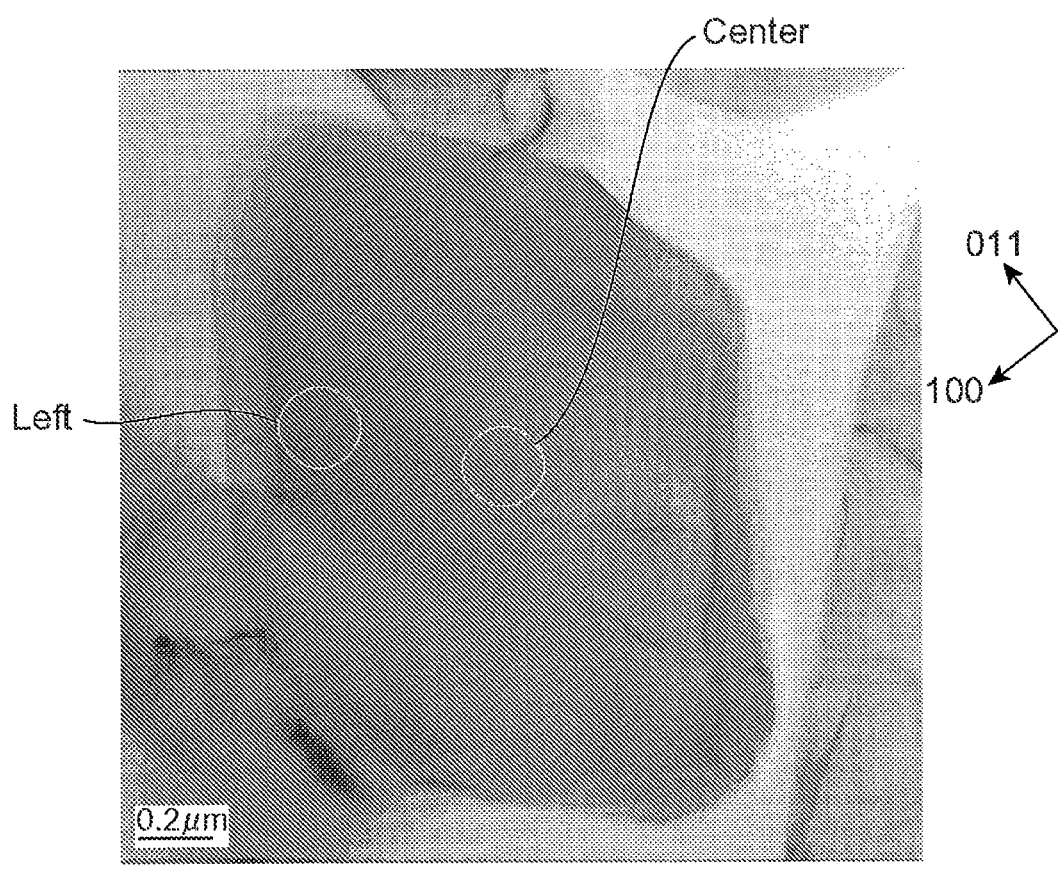

FIG. 3 is a photograph of the crystal particle of LiVOPO$_4$ according to Example 1 of the present invention, which is taken with a transmission electron microscope (TEM).

Figure 4:
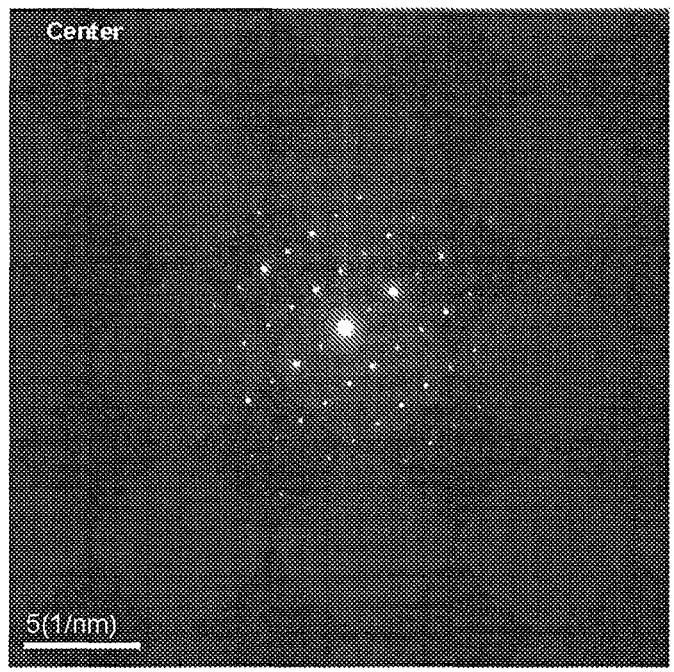
Figure 4:
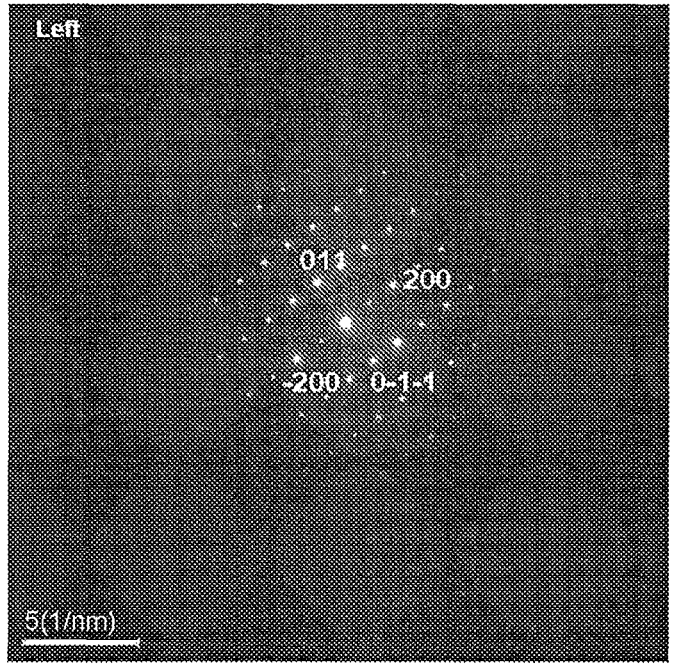

FIG. 4 depicts the electron beam diffraction patterns corresponding to a center region and a left region of the crystal particle of LiVOPO$_4$ of FIG. 3.

Figure 5:
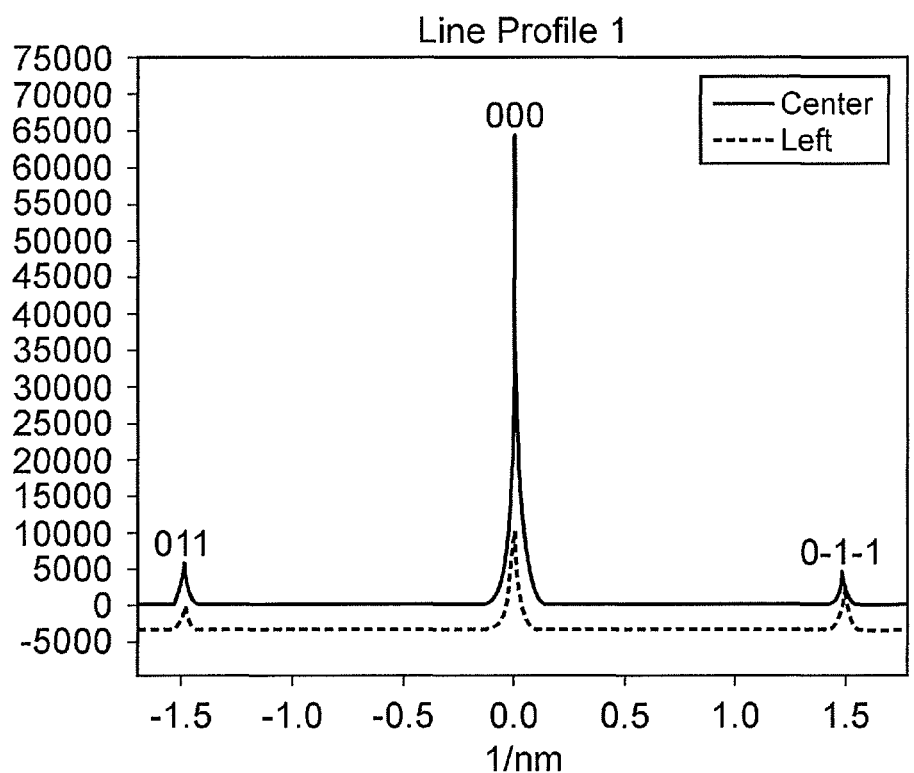
Figure 5:
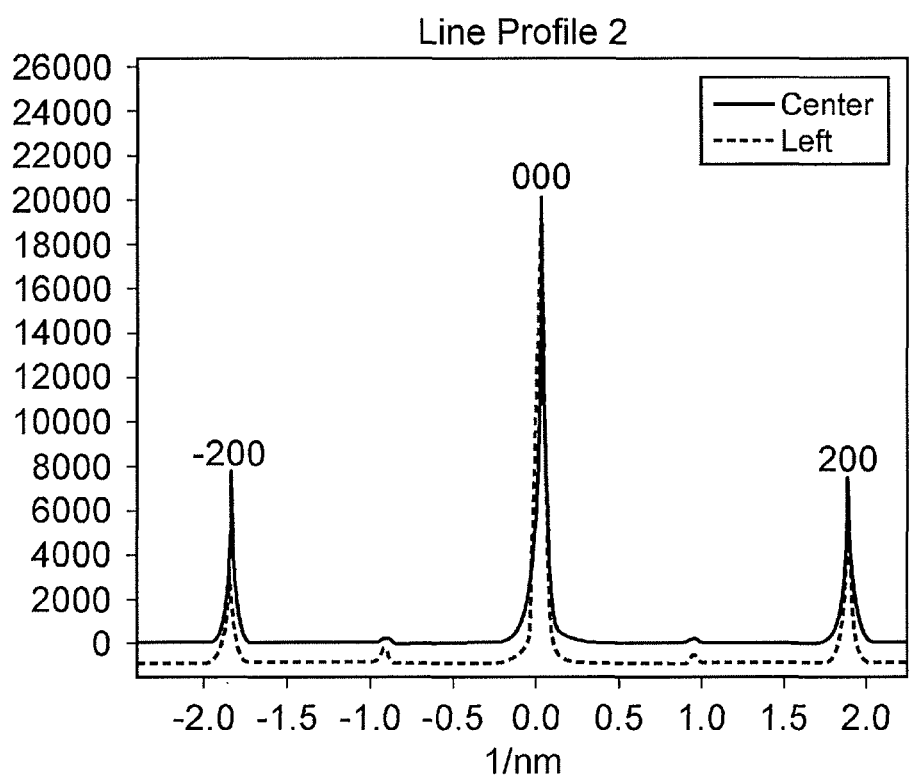

FIG. 5 are diagrams in which Line Profile 1 represents the luminance of an electron beam diffraction spot and a 000 spot from the (011) plane and the (0-1-1) plane of each electron beam diffraction pattern in the center region and the left region of FIG. 4, and Line Profile 2 represents the luminance of an electron beam diffraction spot and a 000 spot from the (−200) plane and the (200) plane of each electron beam diffraction pattern in the center region and the left region of FIG. 4.

Figure 6:
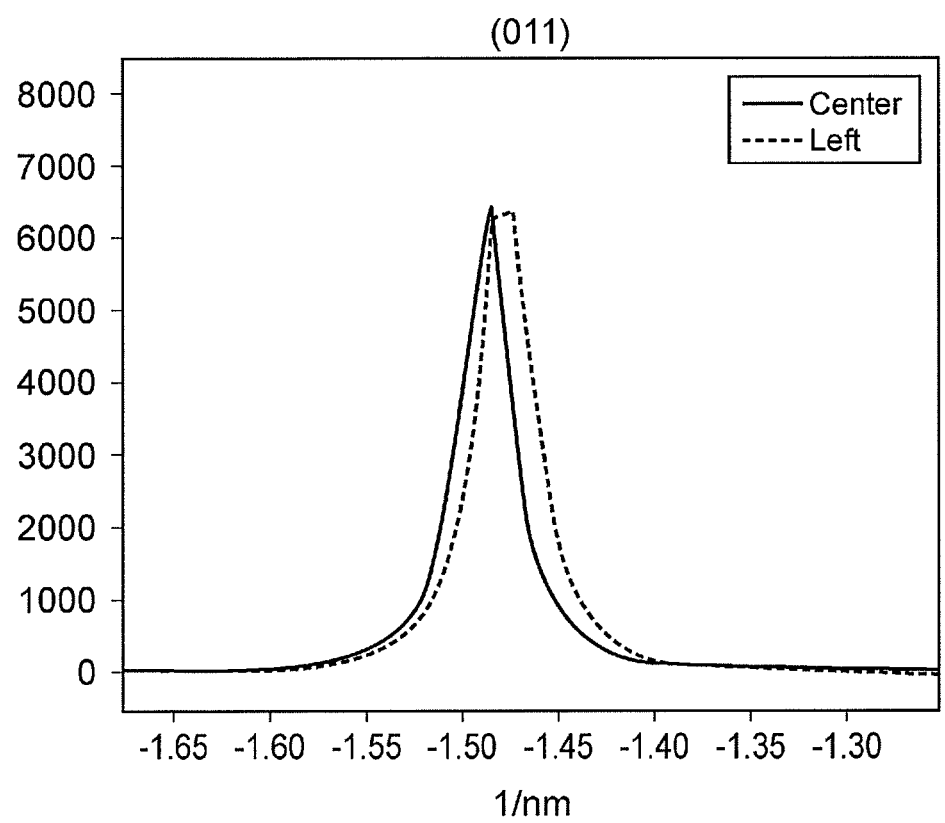

FIG. 6 is a diagram depicting the luminance of an electron beam diffraction spot from the (011) plane at the electron beam diffraction pattern corresponding to the center region of FIG. 3, and the luminance of an electron beam diffraction spot from the (011) plane at the electron beam diffraction pattern corresponding to the left region of FIG. 3.

Figure 7:
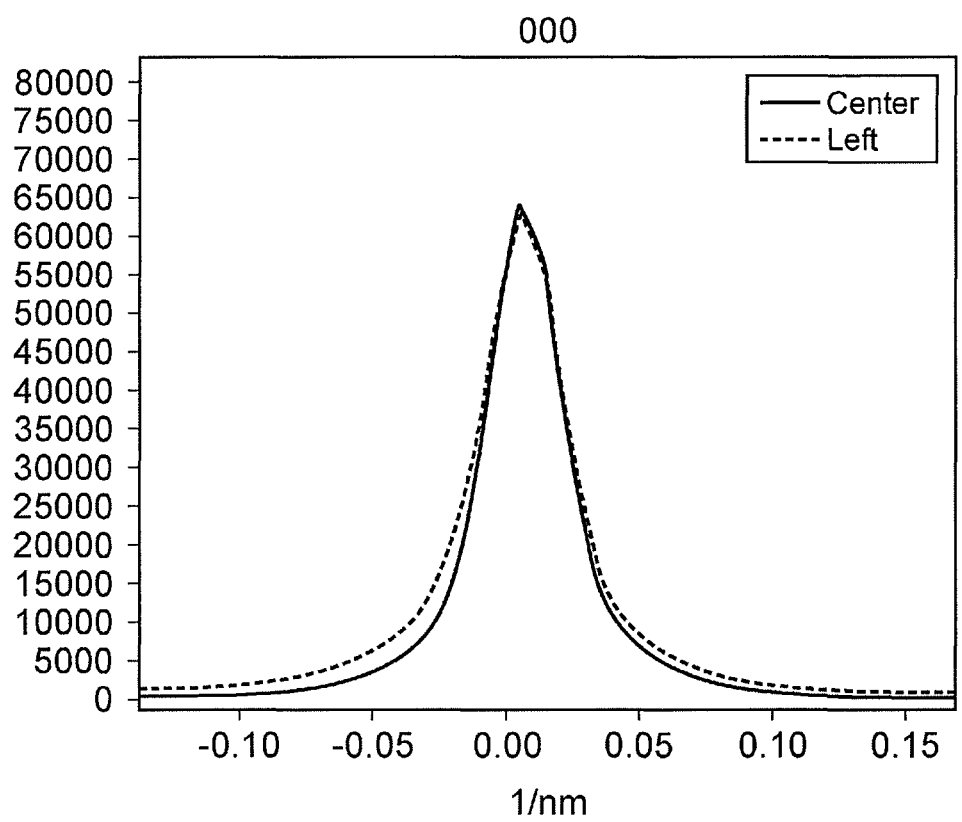

FIG. 7 is a diagram depicting the luminance of a transmitted electron beam spot at the electron beam diffraction pattern corresponding to the center region of FIG. 3 and the luminance of a transmitted electron beam spot at the electron beam diffraction pattern corresponding to the left region of FIG. 3.

Figure 8:
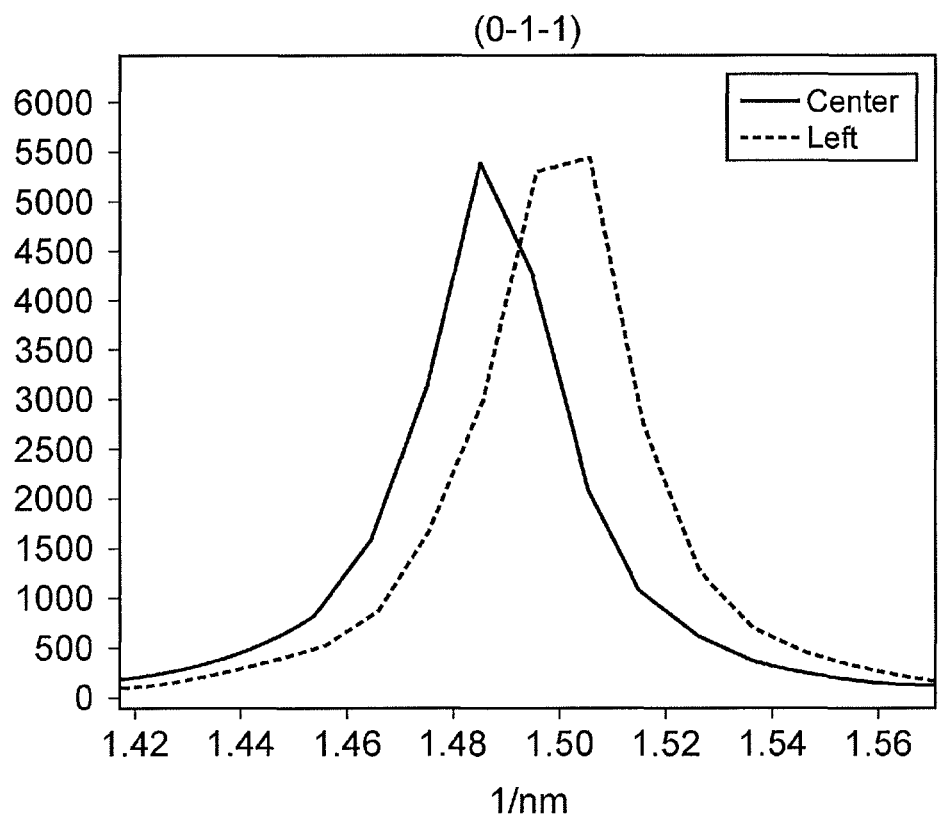

FIG. 8 is a diagram depicting the luminance of an electron beam diffraction spot from the (0-1-1) plane at the electron beam diffraction pattern corresponding to the center region of FIG. 3 and the luminance of an electron beam spot from the (0-1-1) plane at the electron beam diffraction pattern corresponding to the left region of FIG. 3.

Figure 9:
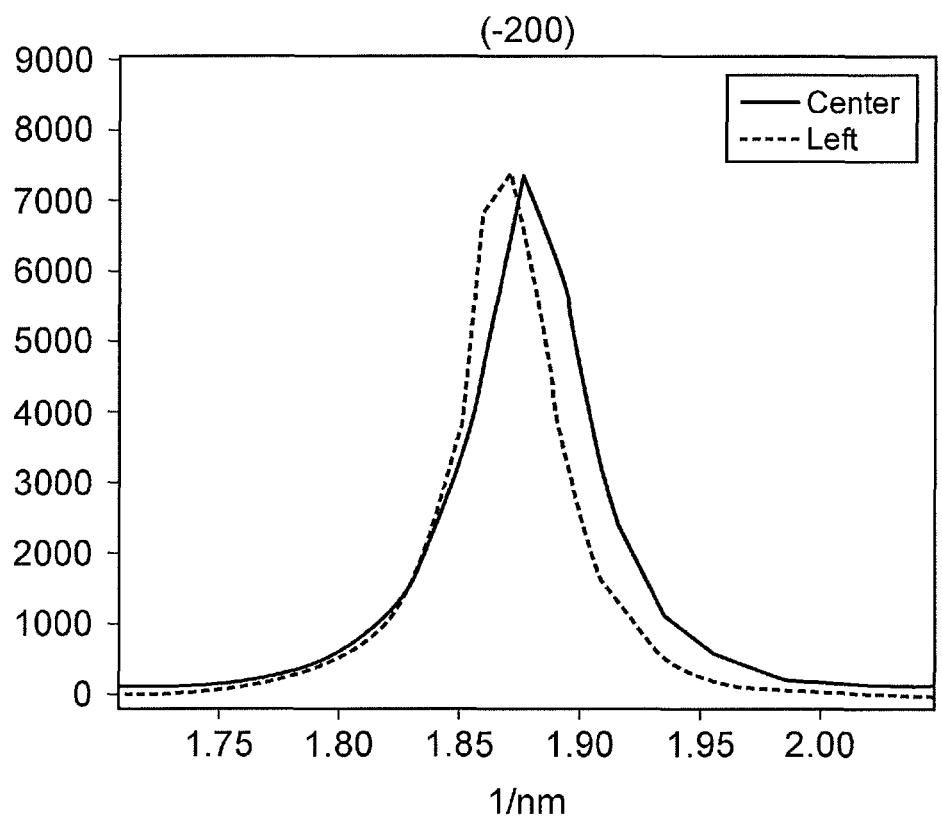

FIG. 9 is a diagram depicting the luminance of the electron beam diffraction spot from the (−200) plane at the electron beam diffraction pattern corresponding to the center region of FIG. 3 and the luminance of the electron beam diffraction spot from the (−200) plane at the electron beam diffraction pattern corresponding to the left region of FIG. 3 along the vertical axis and depicting the inverse number of the interplanar distance along the horizontal axis.

Figure 10:
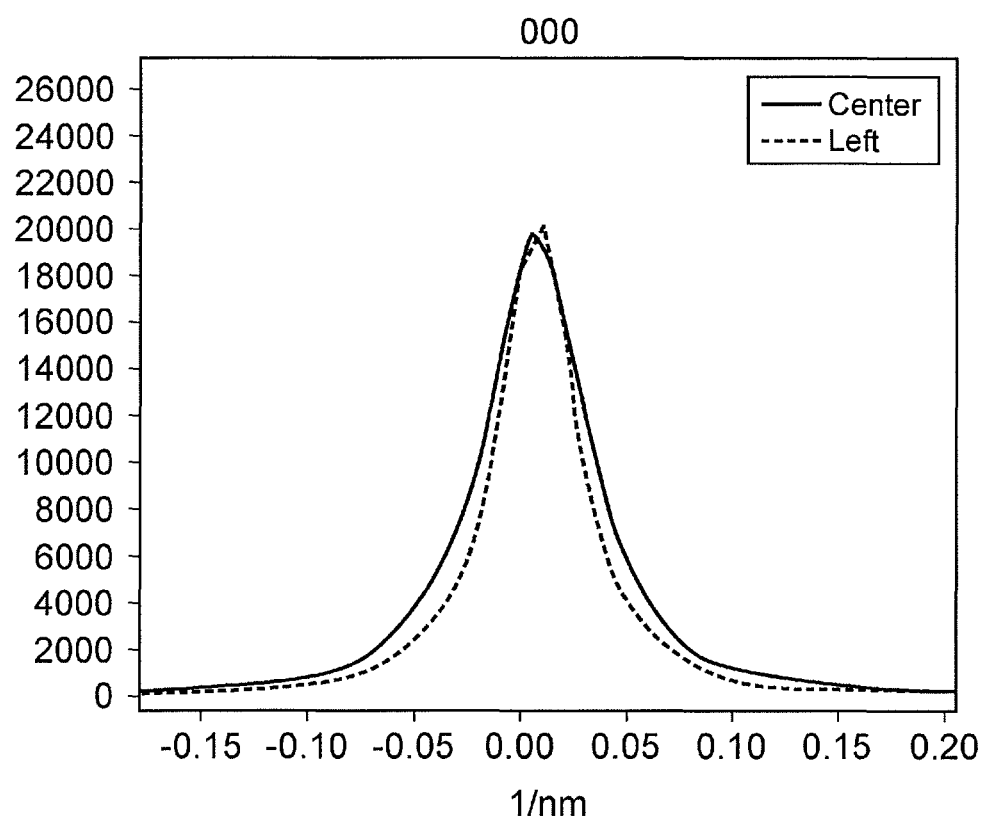

FIG. 10 is a diagram depicting the luminance of a transmitted electron beam spot at the electron beam diffraction pattern corresponding to the center region of FIG. 3 and the luminance of a transmitted electron beam spot at the electron beam diffraction pattern corresponding to the left region of FIG. 3.

Figure 11:
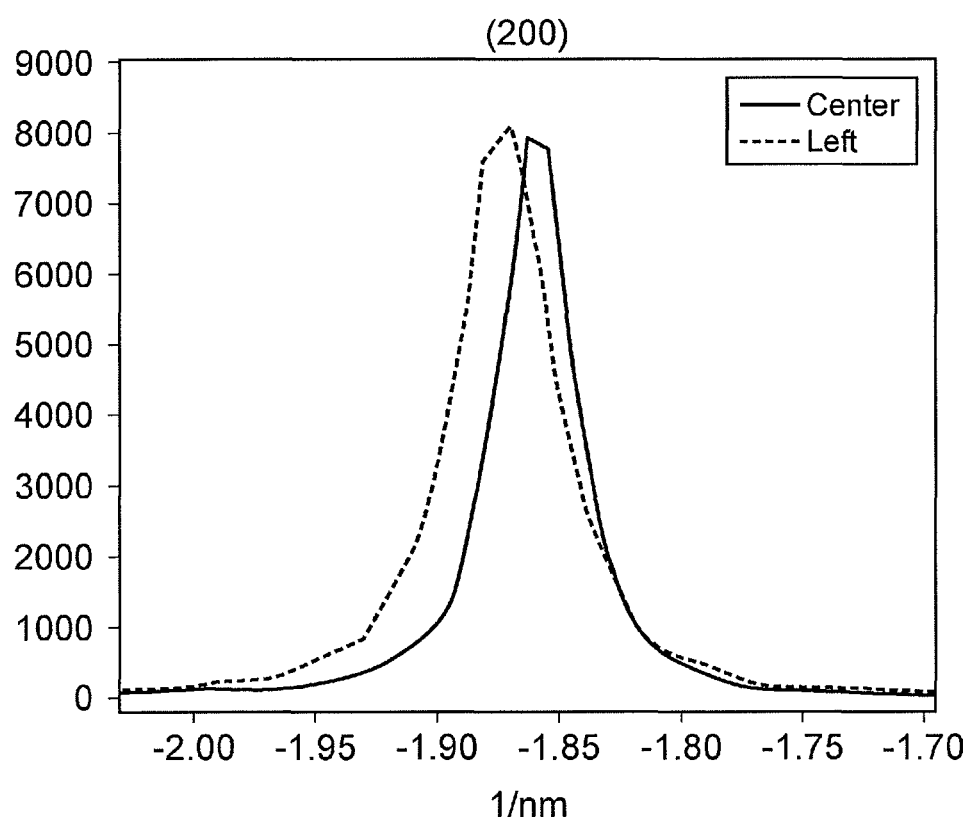

FIG. 11 is a diagram depicting the luminance of the electron beam diffraction spot from the (200) plane at the electron beam diffraction pattern corresponding to the center region of FIG. 3 and the luminance of the electron beam diffraction spot from the (200) plane at the electron beam diffraction pattern corresponding to the left region of FIG. 3.

DESCRIPTION OF PREFERRED EMBODIMENT

A preferred embodiment of the present invention is hereinafter described with reference to the drawings. Note that the same parts or the corresponding parts in the drawings are denoted by the same reference symbol and the redundant description is not made. Moreover, the upper, lower, right, and left positional relations are based on the positional relations as depicted in the drawings unless otherwise stated.

(Method for Manufacturing Active Material)

A method for manufacturing an active material according to an embodiment of the present invention is hereinafter described. The method for manufacturing an active material according to this embodiment includes a first step, a second step, and a third step. In the first step, a mixture solution including a lithium source, a phosphate source, a vanadium source, and water is heated at 150 to 190° C. under pressure, thereby generating a precursor in the mixture solution. In other words, in the first step, the precursor is formed through hydrothermal synthesis reaction. Moreover, in the first step, the pH of the mixture solution including the precursor is adjusted to be in the range of 6 to 8. In the second step, the precursor is heated at 425 to 650° C. after the first step, thereby forming an active material.

According to the method for manufacturing an active material according to this embodiment, LiVOPO$_4$ having less distortion in crystal structure, being microscopic, and being capable of improving the discharge capacity of the battery can be provided.

<First Step>

In the first step, first, the lithium source, the phosphate source, the vanadium source, and water are poured into a reaction container (for example, autoclave) having a function of heating and pressurizing the inside, thereby preparing a mixture solution (aqueous solution) in which these are dispersed.

When the mixture solution is prepared, for example, a mixture of the phosphate source, the vanadium source, and water may be refluxed first, and the lithium source may be added thereto. Through this reflux, a composite of the phosphate source and the vanadium source can be formed. Further, a reducing agent may be added to the mixture solution. This can reduce the pentavalent vanadium in the mixture solution and facilitate the generation of tetravalent vanadium constituting a part of the LiVOPO$_4$.

As the lithium source, at least one kind selected from the group consisting of LiNO$_3$, Li$_2$CO$_3$, LiOH, LiCl, Li$_2$SO$_4$, Li$_3$PO$_4$, and CH$_3$COOLi can be used.

As the phosphate source, at least one kind selected from the group consisting of H$_3$PO$_4$, NH$_4$H$_2$PO$_4$, (NH$_4$)$_2$HPO$_4$ and Li$_3$PO$_4$ can be used.

As the vanadium source, at least one kind selected from the group consisting of V$_2$O$_5$ and NH$_4$VO$_3$ can be used.

Note that two or more kinds of the lithium sources may be used in combination, or two or more kinds of the lithium sources and two or more kinds of the vanadium sources may be used in combination.

As the reducing agent, for example, at least one of hydrazine (NH$_2$NH$_2$·H$_2$O) and hydrogen peroxide (H$_2$O$_2$) may be used. As the reducing agent, hydrazine is preferable. The use of hydrazine tends to drastically increase the discharge capacity and the rate characteristic of the battery as compared with the use of another reducing agent.

In the first step, the ratio of the number of moles [P] of the phosphorus element contained in the mixture solution to the number of moles [V] of the vanadium element contained in the mixture solution, [P]/[V], is preferably adjusted to be in the range of 0.9 to 1.2 before the mixture solution is heated under pressure. This makes it easy to increase the discharge capacity of the battery. Note that the [P]/[V] may be adjusted by the mixing ratio between the phosphate source and the vanadium source contained in the mixture solution.

In the first step, the ratio of the number of moles [Li] of the lithium element contained in the mixture solution to the

[V], [Li]/[V], is preferably adjusted to be in the range of 0.9 to 1.2 before the mixture solution is heated under pressure. This makes it easy to increase the discharge capacity of the battery. Note that the [Li]/[V] may be adjusted by the mixing ratio between the lithium source and the vanadium source contained in the mixture solution.

In the first step, the pH of the mixture solution may be adjusted before the mixture solution is heated under pressure. As the mixture solution before the hydrothermal synthesis reaction has lower pH, the β-type crystal phase tends to be formed more easily, thereby improving the discharge capacity drastically.

The pH of the mixture solution can be adjusted in various ways. For example, an acid agent or a basic agent may be added to the mixture solution. As the acid agent, nitric acid, chloric acid, sulfuric acid, or the like can be used. As the basic agent, for example, an ammonia aqueous solution or the like can be used. Note that the pH of the mixture solution varies with the amount of the mixture solution or the kind of, or the mixing ratio among the lithium source, the phosphate source, and the vanadium source. Therefore, the amount of addition of the acid agent or the basic agent may be adjusted as appropriate in accordance with the amount of the mixture solution or the kind of, or the mixing ratio among the lithium source, the phosphate source, and the vanadium source.

In the first step, the mixture solution in the airtight container is heated under pressure. This promotes the hydrothermal synthesis reaction in the mixture solution. Thus, the precursor of $LiVOPO_4$ (for example, a compound formed from the lithium source, the phosphate source, or the vanadium source, or seed crystal of $LiVOPO_4$) is hydrothermally synthesized.

In the first step, the mixture solution is heated at approximately 150 to 190° C. under pressure. If the heating temperature of the mixture solution (temperature of the hydrothermal synthesis reaction) is out of the above range, the crystal structure of $LiVOPO_4$ to be obtained finally is distorted. As the heating temperature of the mixture solution is lower, the excessive crystal growth of the precursor is suppressed more easily. Therefore, by controlling the heating temperature of the mixture solution to be in the above range, $LiVOPO_4$ having nanometer-level small particle diameter and having high Li diffusion capability in addition to having high crystallinity and excellent capacity density can be obtained.

If the temperature of the mixture solution in the first step (hydrothermal synthesis reaction) is too low, the generation and crystal growth of the precursor do not progress sufficiently. As a result, the crystallinity of $LiVOPO_4$ to be obtained finally deteriorates and the capacity density becomes lower, so that it becomes difficult to improve the discharge capacity of the battery. On the contrary, if the temperature of the mixture solution is too high, the crystal growth of the precursor progresses excessively, so that the Li diffusion capability of the $LiVOPO_4$ crystal deteriorates. For this reason, it becomes difficult to improve the discharge capacity and the rate characteristic of the battery with $LiVOPO_4$ to be obtained. Further, if the temperature of the mixture solution is too high, the reaction container needs to have high heat resistance, which increases the manufacturing cost for the active material. By setting the temperature of the mixture solution to be in the above range, these tendencies can be suppressed.

In the first step (hydrothermal synthesis reaction), the pressure applied to the mixture solution is preferably in the range of 0.2 to 1 MPa. If the pressure applied to the mixture solution is too low, the crystallinity of $LiVOPO_4$ to be obtained finally tends to be low, resulting in that the capacity density is low. If the pressure applied to the mixture solution is too high, the reaction container needs to have high pressure resistance, which increases the manufacturing cost for the active material. By setting the pressure applied to the mixture solution to be in the above range, these tendencies can be suppressed. However, even if the pressure applied to the mixture solution is out of the above range, the active material of this embodiment can be synthesized.

In the first step, the time for heating the mixture solution under pressure (reaction time of the hydrothermal synthesis) is preferably 1 hour or more and 20 hours or less, more preferably 2 hours or more and 18 hours or less. If the reaction time is too short, it is likely that crystal nuclei cannot be formed sufficiently and the capacity is decreased. If the reaction time is too long, it is likely that the crystal growth proceeds excessively to expand the particle diameter and the discharge capacity is decreased.

After the hydrothermal synthesis reaction, the pH of the mixture solution including the precursor is adjusted to be in the range of 6 to 8. Thus, the $LiVOPO_4$ crystal having small particle diameter in the nanometer level and having less distortion can be obtained. If the pH is too low, it is likely that the $LiVOPO_4$ to be obtained has large particle diameter and the discharge capacity is decreased. If the pH is too high, the active material to be obtained comes to have a larger proportion of the α-type crystal of $LiVOPO_4$, thereby reducing the capacity. The method of adjusting the pH after the hydrothermal synthesis reaction is similar to the method of adjusting the pH before the hydrothermal synthesis reaction. Note that the pH of the mixture solution including the precursor can be controlled to be in the range of 6 to 8 by merely adjusting the pH of the mixture solution before the hydrothermal synthesis reaction.

After the pH of the mixture solution including the precursor is adjusted to be in the range of 6 to 8, the mixture solution including the precursor may be preliminarily heated at approximately 60 to 150° C. for approximately 1 to 30 hours before the thermal treatment in the second step. By the preliminary thermal treatment, unnecessary moisture or organic solvent is removed from the mixture solution and the precursor in the solid (powdery) state can be obtained. As a result, the intake of impurities into $LiVOPO_4$ in the thermal treatment step can be prevented and the particle shape can be homogenized.

<Second Step>

After the first step, the precursor is heated in the second step (thermal treatment step). In the second step, the reaction of the lithium source, the phosphate source, and the vanadium source, which did not proceed in the hydrothermal synthesis step, can be advanced or the crystal growth of $LiVOPO_4$ generated in the first step can be promoted.

In the second step, the precursor is heated at 425 to 650° C. By heating the precursor in this temperature range, the crystal particle of $LiVOPO_4$ with less distortion having the small particle diameter in the nanometer level can be obtained. If the thermal treatment temperature (burning temperature) is too low, the crystal growth of $LiVOPO_4$ does not progress sufficiently, so that the capacity density becomes low. If the temperature in the thermal treatment is too high, the growth of $LiVOPO_4$ proceeds excessively to increase the particle diameter of $LiVOPO_4$. As a result, the diffusion of lithium in the active material becomes slower, thereby reducing the capacity density of the active material. For these reasons, if the thermal treatment temperature is out of the above range, it is difficult to improve the discharge capacity and the rate characteristic of the battery.

The thermal treatment time for the precursor is preferably 3 to 20 hours. The atmosphere for the thermal treatment is preferably a nitrogen atmosphere, an argon atmosphere, or an air atmosphere.

The active material (LiVOPO$_4$) roughly pulverized after the second step, and a carbon material including carbon with a tap density of 0.03 to 0.09 g/ml and carbon with a tap density of 0.1 to 0.3 g/ml may be mixed and pulverized using a planetary ball mill or the like.

(Active Material)

According to the method for manufacturing an active material according to this embodiment, the β-type LiVOPO$_4$ with less distortion in the crystal structure can be obtained. In the LiVOPO$_4$ with less distortion in the crystal structure (lattice skeleton), the diffusion path for lithium ions is difficult to bend, so that the diffusion capability and the intercalation and deintercalation capability of lithium ions are improved as compared with the conventional LiVOPO$_4$ with distortion. Thus, in the lithium ion secondary battery including the active material of this embodiment for the positive electrode, the discharge capacity is improved as compared with the conventional battery including the LiVOPO$_4$ with distortion. However, the advantageous effect of this embodiment is not limited to the above matter.

Figure 1:
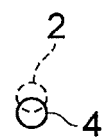
FIG. 1(a) is a schematic diagram of electron beam diffraction patterns corresponding to a region with distortion and a region without distortion in the $LiVOPO_4$ crystal.
FIG. 1(b) is a schematic diagram of a crystal structure (crystal lattice) of the $LiVOPO_4$ crystal without distortion, and FIG.
Figure 1:
Figure 1:
Figure 1:
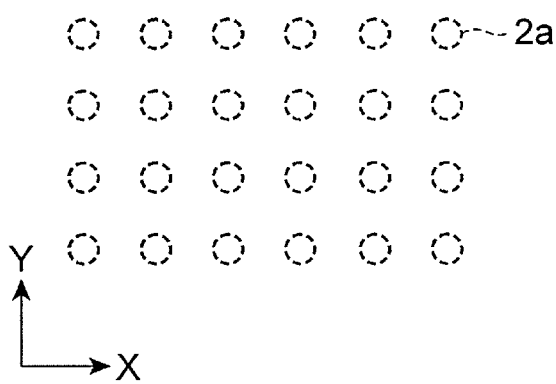
Figure 1:
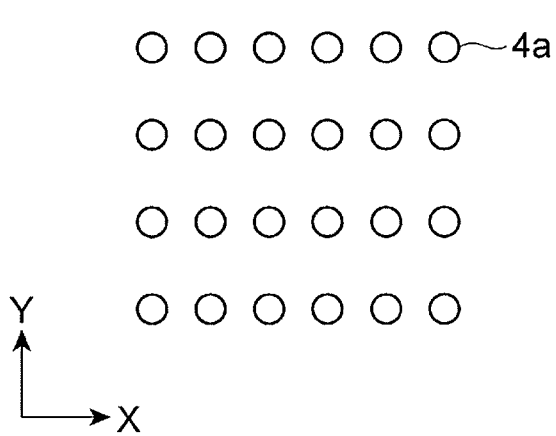

The distortion of the crystal structure of LiVOPO$_4$ can be evaluated as follows. First, as depicted in FIG. 1(a), an electron diffraction pattern 2 at a reference point of the crystal particle of LiVOPO$_4$ is measured. As the reference point, the central part of the crystal particle, at which no distortion is observed, may be selected. Moreover, an electron diffraction pattern 4 at an arbitrary target point (for example, an end side of the crystal particle), which is different from the reference point, of the crystal particle of LiVOPO$_4$ is measured. During the measurement, the setting values of the optical system are not changed. Based on the difference between the electron diffraction pattern 2 at the reference point and the electron diffraction pattern 4 at the target point (specifically, the position of the diffraction spot), the distortion of the crystal structure at the target point from the crystal structure at the reference point can be analyzed. As depicted in FIG. 1(b) and FIG. 1(c), this analysis indicates that a crystal structure 4a at the target point contracts in the X direction or expands in the Y direction relative to a crystal structure 2a at the reference point.

As a specific method for analyzing the distortion of the crystal structure, selected-area diffraction (SAD) or nano-beam diffraction (NBD) may be used, for example.

SAD is the technique of analyzing qualitatively the crystal structure by irradiating a specimen (crystal particle of LiVOPO$_4$) with a parallel incidence electron beam and obtaining a diffraction pattern composed of a series of spots. By inputting a selected area aperture at an image plane of an objective lens, the position of the specimen (diameter: several hundreds of nanometers) at which the diffraction pattern is obtained can be selected. With this method, the lattice constant, lattice type, crystal orientation, distortion at the particular position (reference point, target point) can be known.

NBD is a technique of analyzing qualitatively the crystal structure by irradiating a specimen (crystal particle of LiVOPO$_4$) with a parallel electron beam and obtaining a diffraction pattern composed of a series of spots, and after that converging the electron beam on the specimen to irradiate a nanometer-size region (reference point, target point) with the use of a small condenser aperture. Here, the diffraction spot is shaped like a disc corresponding to the convergence angle of the electron beam. With this technique, the lattice constant, lattice type, and crystal orientation in the nanometer-size region can be known.

In the SAD, the observation region is determined by the selected area aperture. In the NBD, the observation region is determined by the convergence angle and the condenser aperture.

According to the method for manufacturing an active material of this embodiment, the distortion in <100> direction in the β-type crystal of LiVOPO$_4$ can be controlled to be 1.2% or less. By the use of the LiVOPO$_4$ with a distortion of 1.2% or less in <100> direction, the discharge capacity of the battery can be improved as compared with the battery with the conventional LiVOPO$_4$ with large distortion. The distortion α (unit: %) in the β-type crystal of LiVOPO$_4$ in <100> direction is calculated by the following formula (1):

$$\alpha=\{(a-b)/a\}\times 100 \qquad (1)$$

In the formula (1), a represents the distance (unit: 1/nm) between the diffraction spot on the (200) plane and the diffraction spot on the (−200) plane of the electron beam diffraction pattern at the reference point, and b represents the distance (unit: 1/nm) between the diffraction spot on the (200) plane and the diffraction spot on the (−200) plane of the electron beam diffraction pattern at the target point. Here, the distances a and b are the distances in the inverse space (inverse number of the interplanar distance of the crystal lattice). In other words, the distance between the diffraction spots of the electron beam diffraction pattern corresponds to the inverse number of the interval of the crystal plane. For example, the interval (unit: 1/nm) between the diffraction spot on the (200) plane and the 000 spot (transmitted electron beam spot) is equal to the inverse number of the interplanar distance (unit: nm) of the (200) plane. Therefore, the distortion α is the value corresponding to the change rate of the inter-plane distance (unit: nm) between the (200) plane and the (−200) plane at the target point relative to the inter-plane distance (unit: nm) between the (200) plane and the (−200) plane at the reference point of the crystal particle of LiVOPO$_4$.

According to the method for manufacturing an active material of this embodiment, the mean particle diameter of the crystal particles of LiVOPO$_4$ contained in the active material can be controlled to be in the range of approximately 300 nm to 1 μm. As the primary particle becomes smaller, the specific surface area thereof increases to enhance the intercalation and deintercalation capability for the lithium ions. Further, the filling ratio of the active material in the active material layer tends to increase, thereby increasing the capacity density of the battery.

(Electrode, Lithium Ion Secondary Battery, and Method for Manufacturing the Same)

As depicted in FIG. 2, a lithium ion secondary battery 100 according to this embodiment includes: a power generating element 30 including a plate-like negative electrode 20 and a plate-like positive electrode 10, which face each other, and a plate-like separator 18 disposed adjacent to, and between the negative electrode 20 and the positive electrode 10; an electrolytic solution containing lithium ions; a case 50 housing these in a sealed state; a negative electrode lead 62 having one end electrically connected to the negative electrode 20 and having the other end projecting out of the case; and a positive electrode lead 60 having one end electrically connected to the positive electrode 10 and having the other end projecting out of the case.

The negative electrode 20 includes a negative electrode current collector 22 and a negative electrode active material layer 24 stacked on the negative electrode current collector 22. The positive electrode 10 includes a positive electrode current collector 12 and a positive electrode active material layer 14 stacked on the positive electrode current collector 12. The separator 18 is disposed between the negative electrode active material layer 24 and the positive electrode active material layer 14.

The positive electrode active material layer 14 contains at least the active material of this embodiment and a conductive auxiliary agent. Examples of the conductive auxiliary agent include a carbon material such as carbon blacks, powder of metal such as copper, nickel, stainless steel, or iron, a mixture of the carbon material and the powder of the metal, and a conductive oxide such as ITO. The carbon material preferably includes carbon with a tap density of 0.03 to 0.09 g/ml and carbon with a tap density of 0.1 to 0.3 g/ml. The positive electrode active material layer may contain a binder for binding the active material and the conductive auxiliary agent. The positive electrode active material layer 14 can be formed by a step of applying a coating including the LiVOPO$_4$ obtained by the manufacturing method of this embodiment, the binder, the solvent, and the conductive auxiliary agent on the positive electrode current collector 12.

For the negative electrode active material contained in the negative electrode active material layer 24, for example, a carbon material such as natural graphite, synthetic graphite, hard carbon, soft carbon, or low temperature heat-treated carbon, metal or alloy which can combine with lithium, such as Al, Si, Sn, or Si, an amorphous compound mainly including an oxide such as SiO$_x$ (1<x≤2) or SnO$_x$ (1<x≤2), lithium titanate (Li$_4$Ti$_5$O$_{12}$), or TiO$_2$ is given. The negative electrode active material may be bound by a binder. The negative electrode active material layer 24 is formed by a step of applying a coating including the negative electrode active material and the like on the negative electrode current collector 22, in a manner similar to the positive electrode active material layer 14.

One preferred embodiment of the method for manufacturing an active material according to the present invention has been described in details; however, the present invention is not limited to the above embodiment.

For example, in the first step, a carbon particle may be added to the mixture before being heated. This allows at least a part of the LiVOPO$_4$ to be generated on a surface of the carbon particle and the carbon particle to carry the LiVOPO$_4$. As a result, the electric conductivity of the active material to be obtained can be improved. As the material of the carbon particle, carbon black (graphite) such as Ketjen black or acetylene black, activated carbon, hard carbon, soft carbon, or the like can be used.

The active material of the present invention can be used as an electrode material for an electrochemical element other than the lithium ion secondary battery. Examples of such an electrochemical element include a secondary battery other than the lithium ion secondary battery such as a metal lithium secondary battery (battery using the electrode containing the active material obtained by the present invention as a cathode and metal lithium as an anode), and an electrochemical capacitor such as a lithium capacitor. These electrochemical elements can be used for a power source in self-running micromachines, IC cards, or the like or for a dispersed power source arranged on a printed board or in a printed board.

EXAMPLES

Hereinafter, the present invention is described in more detail with reference to examples and comparative examples. However, the present invention is not limited to the following examples.

Example 1

In the manufacture of an active material of Example 1, a mixture solution containing the following raw materials was prepared.

Lithium source: 8.48 g (0.20 mol) of LiOH—H$_2$O (molecular weight=41.96, manufactured by Nacalai tesque, super-high grade, purity of 99 wt %)

Phosphate source: 23.07 g (0.20 mol) of H$_3$PO$_4$ (molecular weight=98.00, manufactured by Nacalai tesque, 1st grade, purity of 85 wt %)

Vanadium source: 18.37 g (0.10 mol) of V$_2$O$_5$ (molecular weight=181.88, manufactured by Nacalai tesque, super-high grade, purity of 99 wt %)

Compound of metal element M: 1.32 g (0.005 mol) of Nb$_2$O$_5$ (molecular weight=265.81, manufactured by Nacalai tesque)

Distilled water for 200 g (manufactured by Nacalai tesque, for HPLC (high-speed liquid chromatography))

Another 20 g of distilled water was used between the glass container and the autoclave.

Reducing agent: 2.55 g (0.05 mol) of NH$_2$NH$_2$—H$_2$O (molecular weight=50.06, manufactured by Nacalai tesque, super-high grade, purity of 98 wt %)

As is clear from the content of the lithium source, the phosphate source, and the vanadium source, the starting amounts of the raw materials stoichiometrically correspond to the yield of approximately 33.78 g (0.2 mol) of LiVOPO$_4$ (molecular weight: 168.85).

The above mixture solution was prepared according to the following procedure. First, the above H$_3$PO$_4$ and distilled water were poured into an inner cylinder of an autoclave of 500 mL content. These were stirred with a magnetic stirrer. Then, the above V$_2$O$_5$ was added to the inner cylinder of the autoclave and then the solution was stirred continuously for approximately 2.5 hours. Then, a yellow-orange liquid phase (suspension) was obtained in a flask. While the liquid phase was stirred with the magnetic stirrer, the above hydrazine monohydrate (NH$_2$NH$_2$—H$_2$O) was dropped into the liquid phase. By the drop of the hydrazine monohydrate, the liquid phase turned from the yellow orange into dark green. Subsequently, the above LiOH—H$_2$O was added to the liquid phase in 10 minutes. Just after the addition of LiOH—H$_2$O, the pH of the liquid phase was in the range of 7 to 8. The mixture solution was obtained through the above procedure.

The inner cylinder of the autoclave containing the above mixture solution was sealed. While the mixture solution was stirred with a strong magnetic stirrer, the thermal treatment of the mixture solution was started by predetermined PID control. The inner pressure of the sealed glass container was increased along with the thermal treatment. With this first step, the hydrothermal synthesis reaction was advanced in the inner cylinder of the autoclave. In this first step, the mixture solution in the glass container was heated under pressure for 16 hours. In the first step, the temperature in the glass container was maintained at 160° C. The pressure in the glass container was maintained at 0.6 MPa.

After the thermal treatment was stopped and the temperature in the inner cylinder of the autoclave was lowered to 40° C., the mixture solution was removed from the inner cylinder of the autoclave. Note that it took approximately four hours to decrease the temperature in the inner cylinder of the autoclave to 40° C. after the stop of the thermal treatment. The mixture solution removed from the inner cylinder of the autoclave was light-blue paste. The pH of the mixture solution after the first step was adjusted to 7. The mixture solution was dried at 90° C. for 32 hours, thereby providing 38.27 g of a light-blue solid as a precursor. The drying was performed using an oven. The precursor was pulverized using a commercial coffee mill.

<Second Step>

Into an alumina crucible, 3.00 g of the pulverized precursor was input. A second step (thermal treatment step) of heating the precursor in the alumina crucible was performed using a heating furnace. In the thermal treatment step, the precursor was heated in the air atmosphere. Moreover, in the thermal treatment step, the temperature in the furnace was increased from room temperature to 600° C. in 60 minutes, and after the solid in the alumina crucible was heated at 600° C. for 4 hours, the heating furnace was cooled naturally. Through this thermal treatment step, 2.550 g of yellow-green powder was obtained as the active material of Example 1. The residual ratio of the solid after the thermal treatment step was 85 wt %.

Examples 2 to 7 and Comparative Examples 1 to 4

In Examples 2 to 7 and Comparative Examples 1 to 4, the temperature (temperature in the hydrothermal synthesis reaction) in the glass container in the first step was adjusted to the values shown in Table 1. In Examples 2 to 7 and Comparative Examples 1 to 4, the temperature in the furnace (thermal treatment temperature) in the thermal treatment step was adjusted to the values shown in Table 1. Each active material of Examples 2 to 7 and Comparative Examples 1 to 4 was manufactured by the method similar to that of Example 1 except for the above matter.

[Analysis of Active Material]

As a result of the analysis of the powder X-ray diffraction (XRD), it was confirmed that each of the active materials of all the examples and the comparative examples was the β-type crystal particle of $LiVOPO_4$. With the transmission electron microscope (TEM), the maximum diameters of 20 crystal particles of $LiVOPO_4$ of Example 1 were measured and its mean value (mean particle diameter) was calculated. The mean particle diameters of the other examples and comparative examples were obtained by a method similar to that of Example 1. The mean particle diameters of the examples and the comparative examples are shown in Table 1.

[Analysis of Distortion of Crystal Particle]

FIG. 3 is the photograph of the crystal particle of $LiVOPO_4$ of Example 1 taken with the TEM. The electron beam diffraction patterns in the center region (reference point) and the left region (target point) of the crystal particle depicted in FIG. 3 were photographed. The electron beam diffraction pattern in each region is shown in FIG. 4. The line profiles of the diffraction spots of each crystal orientation of each electron beam diffraction pattern in the center region and the left region are shown in FIG. 5 to FIG. 11. The horizontal axis of each of FIG. 5 to FIG. 11 corresponds to the distance (distance in the inverse space) between the spots in each electron beam diffraction pattern of FIG. 4. The numerals along the horizontal axis are values based on (origin 0) the peak position (000 spot) of the luminance of the electron beam having transmitted the crystal particle, and are the inverse numbers of the interplanar distance of the crystal. The vertical axis represents the intensity (luminance) of the electron beam. The electron beam diffraction pattern was photographed with the SAD. The orientation of the incident electron beam of each electron beam diffraction of the center region and the left region was adjusted to [01-1].

Based on the difference of each electron beam diffraction pattern between the center region and the left region, the distortion α in <100> direction of the β-type crystal particle of $LiVOPO_4$ of Example 1 was calculated. Note that the distortion α is the mean value obtained from the 20 crystal particles.

By a method similar to that of Example 1, the distortion α in <100> direction of the β-type crystal particle of $LiVOPO_4$ of each of the examples and the comparative examples was calculated. The distortion of each of the examples and the comparative examples is shown in Table 1.

[Manufacture of Evaluation Cell]

The active material of Example 1, acetylene black (FX-25, manufactured by DENKI KAGAKU KOGYO KABUSHIKI KAISHA), and Ketjen black (EC600JD, manufactured by Ketjen Black International) were weighed at a weight ratio of 80:5:5, and these were subjected to 1-minute mixing three times in a planetary ball mill. The number of rotations of the planetary ball mill was set to 550 rpm. The resulting mixture and polyvinylidene fluoride (PVDF, KF7305 manufactured by KUREHA CORPORATION) were mixed and dispersed in a solvent, N-methyl-2-pyrrolidone (NMP), thereby preparing slurry. The weight ratio between the mixture and PVDF in the slurry was adjusted to 90:10. This slurry was applied on an aluminum foil as the current collector, dried, and rolled, thereby providing an electrode (positive electrode) provided with an active material layer containing the active material of Example 1.

The obtained electrode and a Li foil as a counter electrode thereof were stacked with a separator including a polyethylene microporous film interposed therebetween, thereby providing a multilayer body (element). This multilayer body was put into an aluminum laminate package. Into this aluminum laminate package, 1 M of EC/DEC (volume ratio of EC:DEC=30:70) was injected as the electrolytic solution and the package was sealed to vacuum, thereby manufacturing an evaluation cell of Example 1.

By a method similar to that of Example 1, the evaluation cells were manufactured each including each active material of Examples 2 to 7 and Comparative Examples 1 to 4 alone.

Using the evaluation cell of Example 1, the discharge capacity (unit: mAh/g) in the case where the discharging rate was 0.1 C (current value at which, when the constant-current discharging is performed at 25° C., the discharging ends in 10 hours) was measured. The measurement results are shown in Table 1. In the measurement of the discharge capacity, the current density was 16 to 160 mA/g (1 C=160 mA/g) and the voltage range was 2.8 to 4.3 V.

By a method similar to that of Example 1, the discharge capacity of each evaluation cell of Examples 2 to 7 and Comparative Examples 1 to 4 was measured. The results are shown in Table 1.

TABLE 1

|  | Temperature in Hydrothermal Sysnthesis Reaction (° C.) | Thermal Treatment Temperature (° C.) | Mean Particle Diameter (μm) | Distortion in <100> Direction α(%) | Discharge Capacity (mAh/g) |
|---|---|---|---|---|---|
| Example 1 | 160 | 600 | 0.72 | 0.26 | 143 |
| Example 2 | 155 | 600 | 0.65 | 0.15 | 145 |
| Example 3 | 170 | 600 | 0.83 | 0.5 | 138 |
| Example 4 | 175 | 600 | 0.9 | 0.8 | 134 |
| Example 5 | 160 | 450 | 0.52 | 0.26 | 140 |
| Example 6 | 160 | 550 | 0.63 | 0.5 | 141 |
| Example 7 | 180 | 600 | 1.1 | 1.1 | 130 |
| Comparative Example 1 | 200 | 600 | 1.56 | 1.5 | 117 |
| Comparative Example 2 | 120 | 600 | 0.23 | 1.4 | 118 |
| Comparative Example 3 | 160 | 700 | 2.2 | 2 | 112 |
| Comparative Example 4 | 160 | 400 | 0.25 | 1.3 | 120 |

DESCRIPTION OF REFERENCE SIGNS

2 electron beam diffraction pattern at reference point
4 electron beam diffraction pattern at target point
2a crystal structure at reference point
4a crystal structure at target point
10 positive electrode
20 negative electrode
12 positive electrode current collector
14 positive electrode active material layer
18 separator
22 negative electrode current collector
24 negative electrode active material layer
30 power generating element
50 case
60, 62 lead
100 lithium ion secondary battery

The invention claimed is:

1. A method for manufacturing an active material, comprising:
   heating a mixture solution that comprises a lithium source, a phosphate source, a vanadium source, a reducing agent, $Nb_2O_5$, and water at a temperature of 150° C. to 190° C. under pressure to generate a precursor in the mixture solution; and then
   adjusting the pH of the mixture solution including the precursor to be 6 to 8; and then
   heating the precursor at 425 to 650° C. to generate an active material;
   wherein the reducing agent is hydrazine monohydrate.

2. A method for manufacturing a lithium ion secondary battery, comprising:
   forming an electrode comprising a current collector and an active material layer stacked on the current collector, the active material layer being formed by applying a coating material on the current collector, the coating material comprising:
   the active material obtained by the method according to claim 1,
   a binder,
   a solvent, and
   a conductive auxiliary agent.

3. An active material comprising β-type crystal of $LiVOPO_4$, wherein distortion in <100>direction in the β-type crystal is 1.2% or less.

4. An electrode comprising a current collector and an active material layer stacked on the current collector, wherein the active material layer includes the active material according to claim 3.

5. The electrode according to claim 4, wherein the active material layer further includes carbon with a tap density of 0.03 to 0.09 g/ml and carbon with a tap density of 0.1 to 0.3 g/ml.

6. A lithium ion secondary battery comprising the electrode according to claim 4.

7. A lithium ion secondary battery comprising the electrode according to claim 5.

* * * * *